US007192537B2

(12) United States Patent
Lucas

(10) Patent No.: US 7,192,537 B2
(45) Date of Patent: Mar. 20, 2007

(54) RADAR EMISSIONS ABSORBING MATERIAL

(75) Inventor: Rick Lucas, St. Clairsville, OH (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 11/002,994

(22) Filed: Dec. 3, 2004

(65) Prior Publication Data

US 2006/0058187 A1 Mar. 16, 2006

Related U.S. Application Data

(60) Provisional application No. 60/526,582, filed on Dec. 4, 2003.

(51) Int. Cl.
*H01B 1/24* (2006.01)
*G21F 1/02* (2006.01)

(52) U.S. Cl. .............. 252/502; 252/510; 252/511; 250/515.1

(58) Field of Classification Search .......... 252/502, 252/510, 511; 523/137; 250/515.1
See application file for complete search history.

(56) References Cited

U.S. PATENT DOCUMENTS

| 4,832,870 A | * | 5/1989 | Clough et al. ............ 252/511 |
| 6,689,295 B2 | * | 2/2004 | Hirohata et al. ........... 252/500 |
| 6,794,035 B2 | * | 9/2004 | Tobita et al. .............. 428/402 |

FOREIGN PATENT DOCUMENTS

| DE | 3217270 | 11/1983 |
| EP | 0790285 | 8/1997 |
| WO | WO 03/072348 | 9/2003 |
| WO | WO 03/078531 | 9/2003 |

* cited by examiner

*Primary Examiner*—Mark Kopec
(74) *Attorney, Agent, or Firm*—Philip D. Lane

(57) ABSTRACT

Radar emission absorbing materials that are moldable or that may be coated on a surface are described. A moldable radar emission absorbing material may include commuted carbon foam particles blended with a moldable matrix. In other embodiments, a radar emission absorbing surface coating material may include comminuted carbon foam particles blended with a solvent-solid system.

8 Claims, 2 Drawing Sheets

RADAR EMISSIONS ABSORBING MATERIAL

CROSS-REFERENCE TO RELATED APPLICATIONS

The present application claims priority to U.S. Provisional application No. 60/526,582 filed Dec. 4, 2003, herein incorporated by reference in its entirety.

FIELD OF THE INVENTION

The present invention relates to a radar absorbing material. More particularly, the present invention is directed to a particulate carbon material blended with a moldable matrix or a solid-solvent system to provide a moldable radar emission absorbing material or a radar emission absorbing surface coating material.

BACKGROUND OF THE INVENTION

The search for materials that are relatively easily adaptable to coating and structural application in naval and aircraft construction is well known and long standing. Such materials are conventionally used to eliminate or at least significantly reduce the "radar signature" of such military vehicles to enemy radar. The search for more effective radar emissions absorbing materials and techniques continues unabated and the development of such materials continues to be of military significance.

SUMMARY OF THE INVENTION

The present invention includes the blending of a particulate carbon material with a moldable matrix to produce a moldable radar emission absorbing material. The moldable matrix may be any relatively non-conductive material that is temporary or permanently deformable by heat and/or pressure. Examples of such materials may include but is not limited to thermosetting polymers, thermoplastic polymers, clays, elastomers, putties, cements, epoxy adhesives, and the like. The particulate carbon material of the preset invention is prepared from a carbon based foam exhibiting an electrical resistivity less than about $1.E^{+06}$ ohm-cm. The moldable radar emission absorbing material has an electrical resistivity from about $1.E^{+00}$ ohm-cm to about $1.E+^{06}$ ohm-cm.

The present invention also includes the blending of a particulate carbon material in solvent-solid systems to provide a radar emission absorbing surface coating material. The solvent-solid system is a paint, or a paint-like system. The particulate carbon material of the preset invention is prepared from a carbon based foam exhibiting and an electrical resistivity less than about $1.E^{+06}$ ohm-cm. The radar emission absorbing surface coating material has an electrical resistivity from about $1.E^{+00}$ ohm-cm to about $1.E^{+06}$ ohm-cm.

DETAILED DESCRIPTION OF EMBODIMENTS OF THE INVENTION

Figure 1:
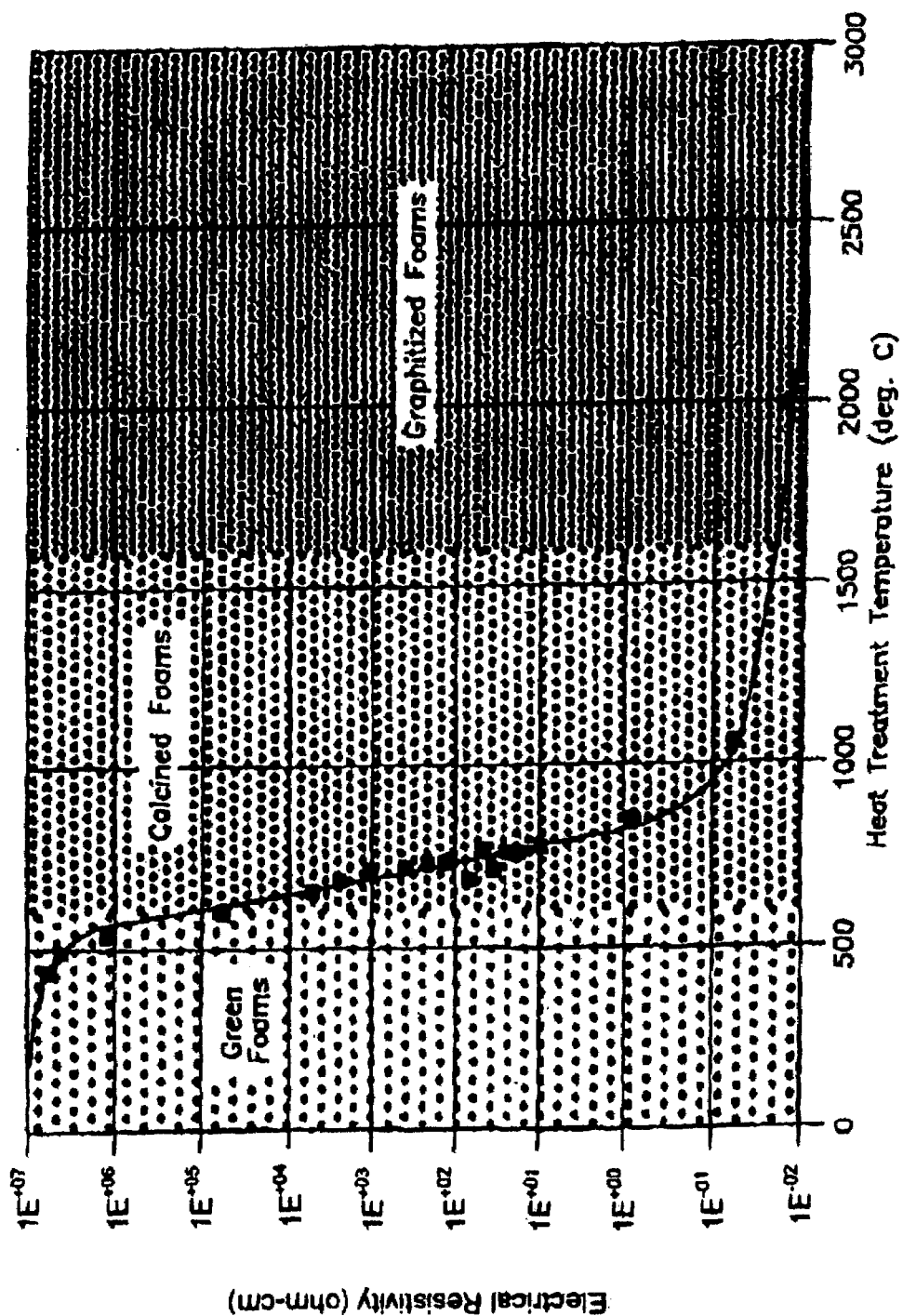
FIG. 1 is a graph of electrical resistivity versus heat treatment temperature for carbon foams useful in the present invention.

The invention includes radar absorbing materials that are easily adaptable to a variety of configurations and situation. In certain embodiments, the invention includes a moldable radar emission absorbing material that can be used for filling of imperfections or joints between large sections of radar emission absorbing materials. Relatively heavy coats of such materials can also be applied to surfaces to provide for the absorption of radar emissions.

The moldable radar emission absorbing material includes comminuted carbon foam particles blended in a moldable matrix. The moldable matrix is not particularly limited and may include relatively non-conductive materials that are temporary or permanently deformable such that they may be molded or formed under pressure and/or heat. The moldable matrix may include, but is not limited to, thermosetting polymers, thermoplastic polymers, clays, elastomers, putties, cements, and epoxy adhesives.

The comminuted carbon foam particles preferably exhibit an electrical resistivity less than about $1.E^{+06}$ ohm-cm. The comminuted carbon foam particles are blended with the moldable matrix in amounts that may vary widely depending on the application and moldable matrix selected. It is expected that, generally, the electrical resistivity of the carbon foam particle—moldable matrix blend will decrease as the proportion of carbon foam particles in the blend increases. Similarly, for a given proportion of carbon foam particles in the blend, it is expected that the blend electrical resistivity will decrease as the electrical resistivity of the carbon foam particulate decreases. Depending on the properties of the moldable matrix, the carbon foam particles, and the desired application, these proportions can be varied to fit a particular radar emission absorbing application. The comminuted carbon foam particles are preferably selected, based on electrical resistivity, and added to the moldable matrix in an amount sufficient that the resulting moldable radar emission absorbing material has a an electrical resistivity from about $1.E^{+00}$ ohm-cm to about $1.E^{+06}$ ohm-cm.

In another embodiment, the invention includes a radar emission absorbing surface coating material. The radar emission absorbing surface coating material includes comminuted carbon foam particles blended with a solvent-solid system. When blended with a solid-solvent system, the resulting material provides for a paint like substance that can be coated upon surface to provide for the absorption of radar emissions. Suitable solvent-solid systems may include systems that have a polymer or other macromolecular substance dissolved in a solvent. Upon evaporation of the solvent, the resulting polymeric or other macromolecular substance cross-links and/or dries producing an extensive molecular network. The carbon foam derived particulate material blended in such a solvent-solid system is then entrapped, or otherwise immobilized, within the resulting extensive molecular network. Solvent-solid systems may include those materials commonly known as paints. Other solvent-solid systems may include, but is not limited to paints, solvent glues, solvent dissolved resins, and other paint-like materials.

The comminuted carbon foam particles preferably exhibit an electrical resistivity less than about $1.E^{+06}$ ohm-cm. The comminuted carbon foam particles are blended with the solvent-solid system in amounts that may vary widely depending on the application and solvent-solid system selected. The comminuted carbon foam particles are preferably added to the solvent-solid system in an amount sufficient that the resulting radar emission absorbing surface coating material has an electrical resistivity from about $1.E^{+00}$ ohm-cm to about $1.E^{+06}$ ohm-cm. It is expected that, generally, the electrical resistivity of the carbon foam particle—solvent-solid system blend will decrease as the proportion of carbon foam particles in the blend increases. Similarly, for a given proportion of carbon foam particles in the blend, it is expected that the blend electrical resistivity will decrease as the electrical resistivity of the carbon foam comprising the particulate decreases. Depending on the properties of the moldable matrix, the carbon foam particles, and the desired application, these proportions can be varied to fit a particular radar emission absorbing application.

Having described the radar emission absorbing materials, the comminuted carbon foam particles will be discussed in more detail. Carbon foams having a density of preferably between about 0.1 g/cm$^3$ and about 0.8 g/cm$^3$ may be produced by the controlled heating of coal particulate preferably up to ¼ inch in diameter in a mold and under a non-oxidizing atmosphere. The process may generally include heating the coal particles in a mold and under a non-oxidizing atmosphere at a heat up rate of from about 1 to about 20° C. to a temperature of between about 300 and about 700° C. The material may be soaked at a temperature of between about 300 and 700° C. for from about 10 minutes up to about 12 hours. The non-oxidizing atmosphere may be provided by the introduction of inert or non-oxidizing gas into the mold at a pressure of from about 0 psig, i.e., free flowing gas, up to about 500 psi. As heating is applied, the pressure in the mold increases to a pressure above atmospheric pressure up to about 500 psi. The inert gas used may be any of the commonly used inert or non-oxidizing gases such as nitrogen, helium, argon, $CO_2$, etc.

It is generally not desirable that the reaction chamber be vented or leak during this heating and soaking operation. The pressure of the chamber and the increasing volatile content therein tends to retard further volatilization while the cellular product sinters at the indicated elevated temperatures. If the furnace chamber is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production or an acceptable cellular product. Conventional blowing agents may be added to the particulate prior to expansion to enhance or otherwise modify the pore-forming operation.

The porous carbon foam product of this process may be subsequently carbonized by the application of known techniques, for example, soaking at a temperature of between about 600° C. and about 1200° C. for a period of from about 1 to about 3 hours. Although this is the preferred temperature range for carbonization, carbonization actually occurs at temperatures between about 600° C. and 1600° C. The electrical resistivity of these carbon foams produced within the temperature ranges for the various treatments of the materials described in the aforementioned patent application are shown graphically in FIG. 1. As shown in this graph, so-called "green foam" i.e. foam produced by heating and soaking at temperatures below about 600° C., exhibit an electrical resistivity on the order of about $1.E^{+07}$ ohm-cm, while foam subjected to carbonization, i.e. exposure to temperatures on the order of 600° C. to about 1600° C. exhibit dielectric constants on the order of from about $1.E^{+06}$ ohm-cm to about $1.E^{-02}$ ohm-cm.

Figure 2:
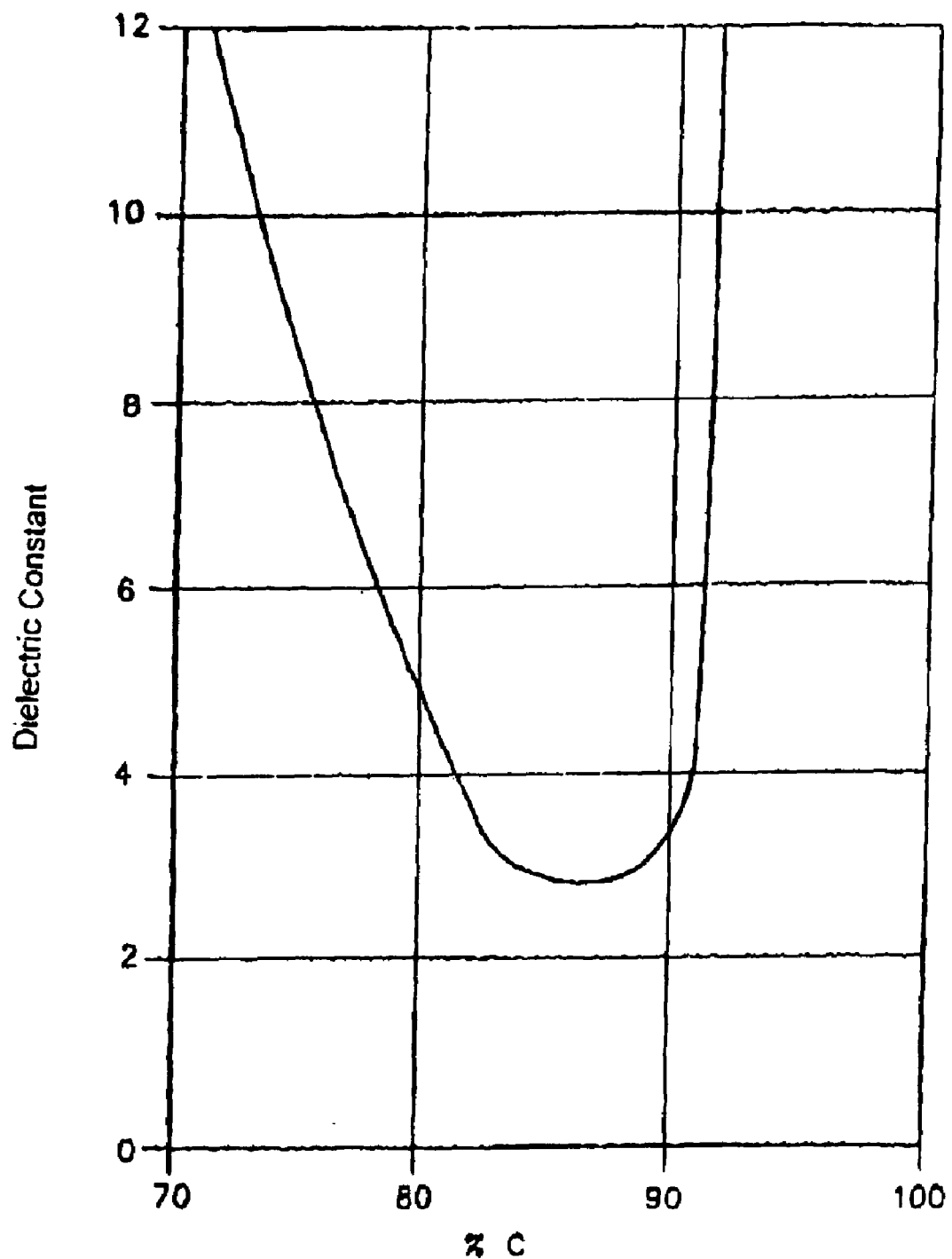
FIG. 2 is a graph of dielectric constant versus weight percent carbon content for carbon foams useful in the present invention.

The carbon foam material undergoes a significant change in dielectric constant, or reactance as it is commonly referred to in the radar signature control arts, as the processing proceeds during the foaming process. Such change is plotted in FIG. 2 as dielectric constant versus weight percent carbon. As shown in this Figure, the dielectric constant undergoes a generally parabolic shift during processing, removal of volatile components, with a minimum being reached at from about 2 to about 6 when the weight percent carbon content of the foam is between about 75 and about 95 weight percent. Without intending to be bound by theory, and without any intent to limit the scope of the present invention, it is hypothesized that as processing proceeds, i.e. the temperature of treatment increases, various molecules and atoms are removed from the carbon structure resulting in a more condensed structure whose dielectric constant achieves a minimum of about 2 and then through further condensation begins to rise again.

Resulting carbon foams exhibiting a dielectric constant of from about of from about 2 to about 6 and simultaneously an electrical resistivity in the range of between about $1.E^{+00}$ ohm-cm and about $1.E^{+06}$ ohm-cm, demonstrate excellent radar emission absorptivity in the megahertz and gigahertz ranges.

The production of carbon foams of this type is controlled by restriction of the maximum temperature of the carbonizing step to a relatively narrow range of from about 600° C. to about 800° C. and preferably from about 600° C. and about 700° C. Attainment of the desired combination of dielectric constant (reactance) and resistivity is achieved after soaking at these temperatures for a period of time under an inert gas. This period of time can be only a matter of minutes, preferably from about 2 to about 30 minutes and most preferably between about 5 and about 20 minutes.

According to certain embodiments, the radar absorbing preformed, cellular product or carbon foam may be produced from powdered coal particulate preferably less than about ¼ inch in diameter by the controlled heating of the powdered coal in a mold under a non-oxidizing atmosphere. The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh.

The radar absorbing carbon foams described herein are typically semi-crystalline or more accurately turbostratically-ordered and largely isotropic i.e., demonstrating physical properties that are approximately equal in all directions. These materials typically exhibit pore sizes on the order of less than 300 micrometers, although pore sizes of up to 500 micrometers are possible within the operating parameters of the process described. The carbon foam may have a density from about 0.1 to about 0.8 g/cm$^3$, and preferably from about 0.1 to about 0.6 g/cm$^3$. The coal starting material may exhibit a free swell index of between about 3.5 and about 5.0 and preferably between about 3.75 and about 4.5. In general, it has been found that bituminous coals exhibiting free swell indexes within the previously specified ranges provided the suitable foam products in the form of the lowest foam densities and the highest foam specific strengths (compressive strength/density).

Once produced, carbon foam having radar emission absorbing properties are comminuted. The resulting particulate carbon foam material is then blended with a moldable substance or a solvent-solid system to provide the radar emission absorbing material of the present invention as previously described.

While the radar emission absorbing materials of the present invention have been described herein primarily in the context of coal-based foams produced by the foaming of a coal particulate, similar carbon based foams derived from coal tar pitch or other coal derived materials, petroleum pitch, synthetic pitch and even carbon foams produced by the carbonization of polymeric materials such as polyacrylonitrile (PAN) and mixtures or combinations of all or some of these will provide similar desirable properties when appropriately carbonized under controlled conditions of the type described above to produce the desired dielectric constants and electrical resistivities.

As the invention has been described, it will be apparent to those skilled in the art that the same may be varied in many ways without departing from the spirit and scope of the invention. Any and all such modifications are intended to be included within the scope of the appended claims.

What is claimed is:

1. A moldable radar absorbing material comprising:
   a comminuted carbon foam blended with a moldable matrix, wherein the moldable radar absorbing material has an electrical resistivity of about $1.E^{+00}$ ohm-cm to about $1.E^{+06}$ ohm-cm, and wherein said comminuted carbon foam has an electrical resistivity in the range of about $1 E^{+00}$ ohm-cm to about $1 E^{+06}$ ohm-cm.

2. The moldable radar absorbing material of claim 1, wherein said moldable matrix is selected from the group consisting of thermosetting polymers, thermoplastic polymers, clays, elastomers, putties, cements, and epoxy adhesives.

3. The moldable radar absorbing material of claim 1, wherein said comminuted carbon foam has a dielectric constant in the range of about 2 to about 6.

4. The moldable radar absorbing material of claim 1, wherein said carbon foam is derived from a carbon material selected from the group consisting of coal, coal tar pitch, coal derivatives, petroleum pitch, synthetic pitch, and carbon foams produced by the carbonization of polyacrylonitrile.

5. A radar absorbing surface coating material comprising:
   a comminuted carbon foam blended with a solvent-solid system, wherein the radar absorbing surface coating material has of about $1.E^{+00}$ olin-i-cm to about $1.E^{+06}$ ohm-cm, and wherein said comminuted carbon foam has an electrical resistivity in the range of about $1 E^{+00}$ ohm-cm to about $1 E^{+06}$ ohm-cm.

6. The radar absorbing surface coating material of claim 5, wherein said solvent-solid system is selected from the group consisting of paints, solvent glues, and solvent dissolved resins.

7. The radar absorbing surface coating material of claim 5, wherein said comminuted carbon foam has a dielectric constant in the range of about 2 to about 6.

8. The radar absorbing surface coating material of claim 5, wherein said carbon foam is derived from a carbon material selected from the group consisting of coal, coal tar pitch, coal derivatives, petroleum pitch, synthetic pitch, and carbon foams produced by the carbonization of polyacrylonitrile.

* * * * *